(12) United States Patent
Corser et al.

(10) Patent No.: US 10,851,661 B2
(45) Date of Patent: Dec. 1, 2020

(54) SEALING SYSTEM FOR A ROTARY MACHINE AND METHOD OF ASSEMBLING SAME

(71) Applicant: General Electric Company, Schenectady, NY (US)

(72) Inventors: Philip James Corser, London (GB); Sarah Heaven, Warwickshire (GB)

(73) Assignee: General Electric Company, Schenectady, NY (US)

(*) Notice: Subject to any disclaimer, the term of this patent is extended or adjusted under 35 U.S.C. 154(b) by 156 days.

(21) Appl. No.: 16/033,270

(22) Filed: Jul. 12, 2018

(65) Prior Publication Data

US 2019/0040757 A1    Feb. 7, 2019

(30) Foreign Application Priority Data

Aug. 1, 2017   (EP) .................................. 17184175

(51) Int. Cl.
*F01D 11/00*   (2006.01)
*F16J 15/08*   (2006.01)

(52) U.S. Cl.
CPC .......... *F01D 11/008* (2013.01); *F01D 11/006* (2013.01); *F16J 15/0887* (2013.01); *F05D 2220/323* (2013.01); *F05D 2230/60* (2013.01); *F05D 2240/24* (2013.01); *F05D 2240/55* (2013.01); *F05D 2240/57* (2013.01); *F05D 2250/75* (2013.01); *F05D 2260/38* (2013.01)

(58) Field of Classification Search
CPC .. F01D 11/006; F01D 11/008; F05D 2240/55; F05D 2240/57; F05D 2250/75
See application file for complete search history.

(56) References Cited

U.S. PATENT DOCUMENTS

| 3,266,771 | A | * | 8/1966  | Morley .................... F01D 5/30 |
|           |   |   |         |                            416/190  |
| 3,752,598 | A |   | 8/1973  | Bowers et al.                        |
| 3,801,220 | A |   | 4/1974  | Beckershoff                          |
| 3,853,425 | A |   | 12/1974 | Scalzo et al.                        |
| 4,029,436 | A |   | 6/1977  | Shoup et al.                         |
| 4,101,245 | A |   | 7/1978  | Hess et al.                          |

(Continued)

FOREIGN PATENT DOCUMENTS

| CH | 308991 A  | 8/1955 |
| CH | 660207 A5 | 3/1987 |

(Continued)

*Primary Examiner* — Moshe Wilensky
*Assistant Examiner* — Christopher R Legendre
(74) *Attorney, Agent, or Firm* — Armstrong Teasdale LLP

(57) ABSTRACT

A sealing system for a rotary machine is provided. The sealing system includes a pair of circumferentially adjacent rotary components. Each of the rotary components includes a platform, a shank, and a radial seal. The shank extends radially inwardly from the platform and includes a radially extending first side channel and an opposite radially extending second side channel. The radial seal includes a first leg received in the first side channel of a first of the pair of rotary components, a second leg received in the second side channel of a second of the pair of rotary components (201), and a resiliently deformable body extending therebetween, the body including a U-shaped portion located generally centrally between the first leg and the second leg.

22 Claims, 10 Drawing Sheets

(56) References Cited

U.S. PATENT DOCUMENTS

| | | | |
|---|---|---|---|
| 4,177,011 A | 12/1979 | Eskesen et al. | |
| 4,183,720 A | 1/1980 | Brantley | |
| 4,422,827 A | 12/1983 | Buxe et al. | |
| 4,457,668 A | 7/1984 | Hallinger | |
| 4,505,642 A | 3/1985 | Hill | |
| 4,580,946 A | 4/1986 | Bobo | |
| 4,743,164 A | 5/1988 | Kalogeros | |
| 5,226,784 A | 7/1993 | Mueller et al. | |
| 5,228,835 A | 7/1993 | Chlus | |
| 5,257,909 A | 11/1993 | Glynn et al. | |
| 5,277,548 A | 1/1994 | Klein et al. | |
| 5,281,097 A | 1/1994 | Wilson et al. | |
| 5,284,421 A | 2/1994 | Chlus et al. | |
| 5,313,786 A | 5/1994 | Chlus et al. | |
| 5,599,170 A | 2/1997 | Marchi et al. | |
| 5,803,710 A | 9/1998 | Dietrich et al. | |
| 6,017,189 A * | 1/2000 | Judet | F01D 5/081 |
| | | | 416/97 R |
| 6,086,329 A | 7/2000 | Tomita et al. | |
| 6,189,891 B1 | 2/2001 | Tomita et al. | |
| 6,273,683 B1 | 8/2001 | Zagar et al. | |
| 6,315,298 B1 | 11/2001 | Kildea et al. | |
| 6,371,727 B1 | 4/2002 | Stangeland et al. | |
| 6,561,764 B1 | 5/2003 | Tiemann | |
| 6,883,807 B2 | 4/2005 | Smed | |
| 7,101,147 B2 * | 9/2006 | Balsdon | F01D 11/005 |
| | | | 277/642 |
| 7,214,034 B2 * | 5/2007 | Giot | F01D 5/22 |
| | | | 416/193 A |
| 7,566,201 B2 | 7/2009 | Brillert et al. | |
| 7,575,416 B2 | 8/2009 | Funk et al. | |
| 8,137,072 B2 | 3/2012 | Kim et al. | |
| 8,550,785 B2 | 10/2013 | Afanasiev et al. | |
| 8,920,121 B2 | 12/2014 | Dungs et al. | |
| 9,863,263 B2 * | 1/2018 | Berche | F01D 5/26 |
| 2003/0049129 A1 | 3/2003 | Scott et al. | |
| 2005/0082768 A1 | 4/2005 | Iguchi et al. | |
| 2006/0083620 A1 | 4/2006 | Scheurlen et al. | |
| 2006/0110255 A1 | 5/2006 | Itzel et al. | |
| 2006/0177312 A1 | 8/2006 | Tomita et al. | |
| 2006/0257262 A1 | 11/2006 | Itzel et al. | |
| 2007/0258816 A1 | 11/2007 | Bouchard et al. | |
| 2008/0181779 A1 | 7/2008 | Decardenas | |
| 2008/0199307 A1 | 8/2008 | Keller | |
| 2009/0097980 A1 | 4/2009 | Hayasaka et al. | |
| 2010/0008769 A1 | 1/2010 | Arness et al. | |
| 2010/0008782 A1 | 1/2010 | Danescu et al. | |
| 2010/0040479 A1 | 2/2010 | Spangler et al. | |
| 2010/0068063 A1 | 3/2010 | Berg et al. | |
| 2010/0124508 A1 | 5/2010 | Liang | |
| 2010/0129226 A1 | 5/2010 | Strohl et al. | |
| 2010/0150724 A1 | 6/2010 | Forgue et al. | |
| 2010/0158686 A1 | 6/2010 | Kim et al. | |
| 2011/0081245 A1 | 4/2011 | Walunj et al. | |
| 2011/0236183 A1 | 9/2011 | Amaral et al. | |
| 2012/0045337 A1 | 2/2012 | Fedor et al. | |
| 2012/0114480 A1 | 5/2012 | Amaral et al. | |
| 2012/0121384 A1 | 5/2012 | Borufka et al. | |
| 2012/0121423 A1 | 5/2012 | Honkomp et al. | |
| 2012/0121424 A1 | 5/2012 | Wassynger et al. | |
| 2012/0195743 A1 | 8/2012 | Walunj et al. | |
| 2012/0235366 A1 | 9/2012 | Walunj et al. | |
| 2012/0237352 A1 | 9/2012 | Boyer et al. | |
| 2012/0263580 A1 | 10/2012 | Shukla et al. | |
| 2013/0094969 A1 | 4/2013 | Amaral et al. | |
| 2013/0108413 A1 | 5/2013 | Suciu et al. | |
| 2013/0108445 A1 | 5/2013 | Suciu et al. | |
| 2013/0108466 A1 | 5/2013 | Suciu et al. | |
| 2013/0108467 A1 * | 5/2013 | Berche | F01D 5/26 |
| | | | 416/96 R |
| 2013/0108468 A1 | 5/2013 | Suciu et al. | |
| 2013/0195665 A1 | 8/2013 | Snyder et al. | |
| 2014/0003918 A1 | 1/2014 | Salazar et al. | |
| 2014/0003949 A1 | 1/2014 | Adam et al. | |
| 2014/0030100 A1 | 1/2014 | Joshi et al. | |
| 2014/0079529 A1 | 3/2014 | Kareff et al. | |
| 2014/0119917 A1 | 5/2014 | Tarczy et al. | |
| 2014/0119918 A1 | 5/2014 | Tarczy et al. | |
| 2014/0165591 A1 | 6/2014 | Thomen et al. | |
| 2014/0301850 A1 | 10/2014 | Garcia Crespo | |
| 2014/0369844 A1 | 12/2014 | Hansom et al. | |
| 2015/0016960 A1 | 1/2015 | Ravier | |
| 2015/0064018 A1 | 3/2015 | Ahmad et al. | |
| 2019/0040757 A1 * | 2/2019 | Corser | F01D 11/006 |

FOREIGN PATENT DOCUMENTS

| | | |
|---|---|---|
| CH | 698921 B1 | 12/2009 |
| DE | 1258662 A | 1/1968 |
| DE | 2816791 A1 | 11/1978 |
| DE | 19957225 A1 | 6/2001 |
| DE | 10256778 A1 | 1/2004 |
| DE | 10306915 A1 | 9/2004 |
| DE | 10346384 A1 | 4/2005 |
| DE | 10361882 A1 | 7/2005 |
| DE | 102007037208 A1 | 2/2009 |
| DE | 102009004792 A1 | 7/2010 |
| EP | 210940 A1 | 2/1987 |
| EP | 374079 A1 | 6/1990 |
| EP | 437977 A1 | 7/1991 |
| EP | 609838 A1 | 10/1992 |
| EP | 702131 A1 | 3/1996 |
| EP | 717169 A1 | 6/1996 |
| EP | 717170 A1 | 6/1996 |
| EP | 729544 A1 | 9/1996 |
| EP | 745756 A1 | 12/1996 |
| EP | 816638 A2 | 1/1998 |
| EP | 851096 A2 | 7/1998 |
| EP | 851097 A2 | 7/1998 |
| EP | 856641 A1 | 8/1998 |
| EP | 874132 A2 | 10/1998 |
| EP | 874136 A2 | 10/1998 |
| EP | 918139 A2 | 5/1999 |
| EP | 942149 A1 | 9/1999 |
| EP | 995881 A2 | 4/2000 |
| EP | 1013880 A2 | 6/2000 |
| EP | 1041248 A2 | 10/2000 |
| EP | 1067274 A1 | 1/2001 |
| EP | 1096108 A2 | 5/2001 |
| EP | 1136653 A2 | 9/2001 |
| EP | 1164253 A1 | 12/2001 |
| EP | 1167691 A2 | 1/2002 |
| EP | 1177367 A1 | 2/2002 |
| EP | 1180196 A1 | 2/2002 |
| EP | 1180197 A1 | 2/2002 |
| EP | 1221539 A2 | 7/2002 |
| EP | 1249576 A2 | 10/2002 |
| EP | 1284339 A1 | 2/2003 |
| EP | 1378689 A2 | 1/2004 |
| EP | 1452692 A2 | 9/2004 |
| EP | 1452694 A2 | 9/2004 |
| EP | 1477634 A2 | 11/2004 |
| EP | 1512838 A2 | 3/2005 |
| EP | 1521036 A1 | 4/2005 |
| EP | 1522677 A2 | 4/2005 |
| EP | 1528224 A2 | 5/2005 |
| EP | 1589193 A2 | 10/2005 |
| EP | 1600606 A1 | 11/2005 |
| EP | 1617044 A1 | 1/2006 |
| EP | 1635037 A2 | 3/2006 |
| EP | 1790824 A2 | 5/2007 |
| EP | 1795703 A2 | 6/2007 |
| EP | 1867836 A2 | 12/2007 |
| EP | 1867837 A2 | 12/2007 |
| EP | 1914386 A1 | 4/2008 |
| EP | 1944472 A1 | 7/2008 |
| EP | 1995413 A1 | 11/2008 |
| EP | 2009247 A2 | 12/2008 |
| EP | 2028398 A1 | 2/2009 |
| EP | 2039886 A1 | 3/2009 |
| EP | 2053285 A1 | 4/2009 |
| EP | 2053286 A1 | 4/2009 |
| EP | 2055898 A2 | 5/2009 |
| EP | 2098687 A1 | 9/2009 |

(56) References Cited

FOREIGN PATENT DOCUMENTS

| | | |
|---|---|---|
| EP | 2110515 A2 | 10/2009 |
| EP | 2143887 A2 | 1/2010 |
| EP | 2149674 A2 | 2/2010 |
| EP | 2162598 A2 | 3/2010 |
| EP | 2163725 A2 | 3/2010 |
| EP | 2189626 A1 | 5/2010 |
| EP | 2206887 A2 | 7/2010 |
| EP | 2221455 A2 | 8/2010 |
| EP | 2236756 A2 | 10/2010 |
| EP | 2236768 A2 | 10/2010 |
| EP | 2280151 A1 | 2/2011 |
| EP | 2295722 A1 | 3/2011 |
| EP | 2295727 A2 | 3/2011 |
| EP | 2368019 A1 | 9/2011 |
| EP | 2369204 A1 | 9/2011 |
| EP | 2372090 A2 | 10/2011 |
| EP | 2372094 A2 | 10/2011 |
| EP | 2372099 A2 | 10/2011 |
| EP | 2378084 A2 | 10/2011 |
| EP | 2381067 A2 | 10/2011 |
| EP | 2402561 A2 | 1/2012 |
| EP | 2455587 A1 | 5/2012 |
| EP | 2472065 A1 | 7/2012 |
| EP | 2481888 A2 | 8/2012 |
| EP | 2492449 A1 | 8/2012 |
| EP | 2500520 A2 | 9/2012 |
| EP | 2500521 A2 | 9/2012 |
| EP | 2500524 A1 | 9/2012 |
| EP | 2500525 A1 | 9/2012 |
| EP | 2503100 A2 | 9/2012 |
| EP | 2505785 A2 | 10/2012 |
| EP | 2511481 A2 | 10/2012 |
| EP | 2540968 A2 | 1/2013 |
| EP | 2540986 A2 | 1/2013 |
| EP | 2551464 A1 | 1/2013 |
| EP | 2562355 A2 | 2/2013 |
| EP | 2580432 A1 | 4/2013 |
| EP | 2584151 A2 | 4/2013 |
| EP | 2586968 A2 | 5/2013 |
| EP | 2586969 A2 | 5/2013 |
| EP | 2598721 A1 | 6/2013 |
| EP | 2612997 A2 | 7/2013 |
| EP | 2613009 A2 | 7/2013 |
| EP | 2642080 A1 | 9/2013 |
| EP | 2649278 A1 | 10/2013 |
| EP | 2649279 A1 | 10/2013 |
| EP | 2679770 A1 | 1/2014 |
| EP | 2738353 A2 | 6/2014 |
| EP | 2762679 A1 | 8/2014 |
| EP | 2770165 A1 | 8/2014 |
| EP | 2781697 A1 | 9/2014 |
| EP | 2799667 A1 | 11/2014 |
| EP | 2818641 A1 | 12/2014 |
| EP | 2832952 A1 | 2/2015 |
| EP | 2843197 A2 | 3/2015 |
| FR | 2963382 A1 | 2/2012 |
| FR | 2972482 A1 | 9/2012 |
| GB | 786475 A | 11/1957 |
| GB | 1012066 A | 12/1965 |
| GB | 1014577 A | 12/1965 |
| GB | 1063918 A | 4/1967 |
| GB | 1358798 A | 7/1974 |
| GB | 1460714 A | 1/1977 |
| GB | 1491537 A | 11/1977 |
| GB | 1518076 A | 7/1978 |
| GB | 1549152 A | 8/1979 |
| GB | 1549718 A | 8/1979 |
| GB | 2015658 A | 9/1979 |
| GB | 1585186 A | 2/1981 |
| GB | 2062119 A | 5/1981 |
| GB | 2127104 A | 4/1984 |
| GB | 2208529 A | 4/1989 |
| GB | 2221724 A | 2/1990 |
| GB | 2226368 A | 6/1990 |
| GB | 2344383 A | 6/2000 |
| GB | 2400144 A | 10/2004 |
| GB | 2401658 A | 11/2004 |
| GB | 2411697 A | 9/2005 |
| GB | 2412699 A | 10/2005 |
| GB | 2417986 A | 3/2006 |
| GB | 2424248 A | 9/2006 |
| GB | 2446812 A | 8/2008 |
| GB | 2452515 A | 3/2009 |
| GB | 2490858 A | 11/2012 |
| GB | 2496293 A | 5/2013 |
| GB | 2517248 A | 2/2015 |
| JP | S5783608 A | 5/1982 |
| JP | S61205302 A | 9/1986 |
| JP | S6463605 A | 3/1989 |
| JP | H01162502 A | 6/1989 |
| JP | H01181906 A | 7/1989 |
| JP | H02095702 A | 4/1990 |
| JP | H05209536 A | 8/1993 |
| JP | H07305602 A | 11/1995 |
| JP | H094410 A | 1/1997 |
| JP | H09303107 A | 11/1997 |
| JP | 11247616 A | 9/1999 |
| JP | 2011032985 A | 2/2011 |
| JP | 2012107731 A | 6/2012 |
| JP | 2014185646 A | 10/2014 |
| WO | 1987001761 A1 | 3/1987 |
| WO | 2007063128 A1 | 6/2007 |
| WO | 2012135512 A1 | 10/2012 |
| WO | 2013139837 A1 | 9/2013 |
| WO | 2013162664 A2 | 10/2013 |
| WO | 2013181311 A1 | 12/2013 |
| WO | 2013181389 A2 | 12/2013 |
| WO | 2013188731 A1 | 12/2013 |
| WO | 2014004001 A1 | 1/2014 |
| WO | 2014051688 A1 | 4/2014 |
| WO | 2014070695 A1 | 5/2014 |
| WO | 2014070698 A1 | 5/2014 |
| WO | 2014117998 A1 | 8/2014 |
| WO | 2014159152 A1 | 10/2014 |
| WO | 2014159366 A1 | 10/2014 |
| WO | 2014159635 A1 | 10/2014 |
| WO | 2014160641 A1 | 10/2014 |
| WO | 2014163709 A2 | 10/2014 |
| WO | 2014164252 A1 | 10/2014 |
| WO | 2014168743 A1 | 10/2014 |

* cited by examiner

SEALING SYSTEM FOR A ROTARY MACHINE AND METHOD OF ASSEMBLING SAME

BACKGROUND

The field of the disclosure relates generally to rotary machines, and more particularly to a sealing system for a rotary machine.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced rotary components (e.g. turbine blades) that extend outward from each rotor disk to define a stage of the turbine. At least some known rotary components include a platform, a shank that extends radially inward from the platform, and a dovetail region that extends radially inward from the shank to facilitate coupling the rotary component to the rotor disk.

In some machines, a clearance gap is defined between circumferentially adjacent shanks of rotary components in a stage to enable assembly of the row of rotary components and to account for dimensional changes of the rotary components during operation of the turbine. However, the efficiency of at least some turbines may be limited, at least partially as a result of the clearance between adjacent rotary components, by working fluid leakage to and from the main flow path between adjacent rotary component shanks, such as in the front stages of a turbine of a rotary machine. As such, at least some known rotary component designs are modified to reduce the clearance between shanks of circumferentially adjacent rotary components. However, at least some known modifications to the rotary component designs may inhibit assembly of a stage of rotary components and/or may have limited effectiveness in reducing flow path leakage between circumferentially adjacent rotary components.

BRIEF DESCRIPTION

In one aspect, a sealing system for a rotary machine is provided. The sealing system includes a pair of circumferentially adjacent rotary components. Each of the rotary components includes a platform, a shank, and a radial seal. The shank extends radially inwardly from the platform and includes a radially extending first side channel and an opposite radially extending second side channel. The radial seal includes a first leg received in the first side channel of a first of the pair of rotary components, a second leg received in the second side channel of a second of the pair of rotary components, and a resiliently deformable body extending therebetween, the body including a U-shaped portion located generally centrally between the first leg and the second leg.

In another aspect, a rotor assembly for a rotary machine is provided. The rotor assembly includes a row of rotary components spaced circumferentially about a rotor disk. Each rotary component of the row of rotary components includes a platform, a shank, and a plurality of radial seals. The shank extends radially inwardly from the platform and includes a radially extending first side channel and an opposite radially extending second side channel. The radial seal includes a first leg received in the first side channel of a first of the pair of rotary components, a second leg received in the second side channel of a second of the pair of rotary components, and a resiliently deformable body extending therebetween, the body including a U-shaped portion located generally centrally between the first leg and the second leg.

In yet another aspect, a method of assembly a rotor assembly is provided. The method includes coupling a pair of rotary components circumferentially adjacent to each other in a circumferentially extending row of a plurality of rotary components, wherein each of the pair of rotary components includes a platform and a shank extending radially inwardly from the platform, the shank including a radially extending first side channel and an opposite radially extending second side channel. The method also includes resiliently deforming a body of a radial seal inwardly, and inserting the resiliently deformed radial seal from an axially upstream direction such that a first leg of the radial seal is received in the first side channel of a first of the pair of rotary components, a second leg of the radial seal is received in the second side channel of a second of the pair of rotary components, and the body extends therebetween, the body including a U-shaped portion located generally centrally between the first leg and the second leg. The method further includes releasing the body, such that the first and second legs spring back outwardly and are retained in the respective first and second side channels.

DETAILED DESCRIPTION

The embodiments described herein overcome at least some of the disadvantages of known rotary components. The embodiments include a rotary component shank including a first side channel and an opposite second side channel. The first and second side channels of circumferentially adjacent rotary components cooperate to retain, and sealingly interface with, a radially extending seal to facilitate reducing working fluid leakage between the circumferentially adjacent rotary components. In at least some embodiments, working fluid leakage reduction is achieved without modifying the existing rotor disk and/or rows of axially adjacent rotary components, such as rotor blades and axial spacers. Additionally or alternatively, in certain embodiments, the radial seal may be installed and/or removed from individual rotary components after the row of rotary components has been assembled.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "upstream" refers to a forward or inlet end of a rotary machine, and the term "downstream" refers to a downstream or exhaust end of the rotary machine.

Figure 1:
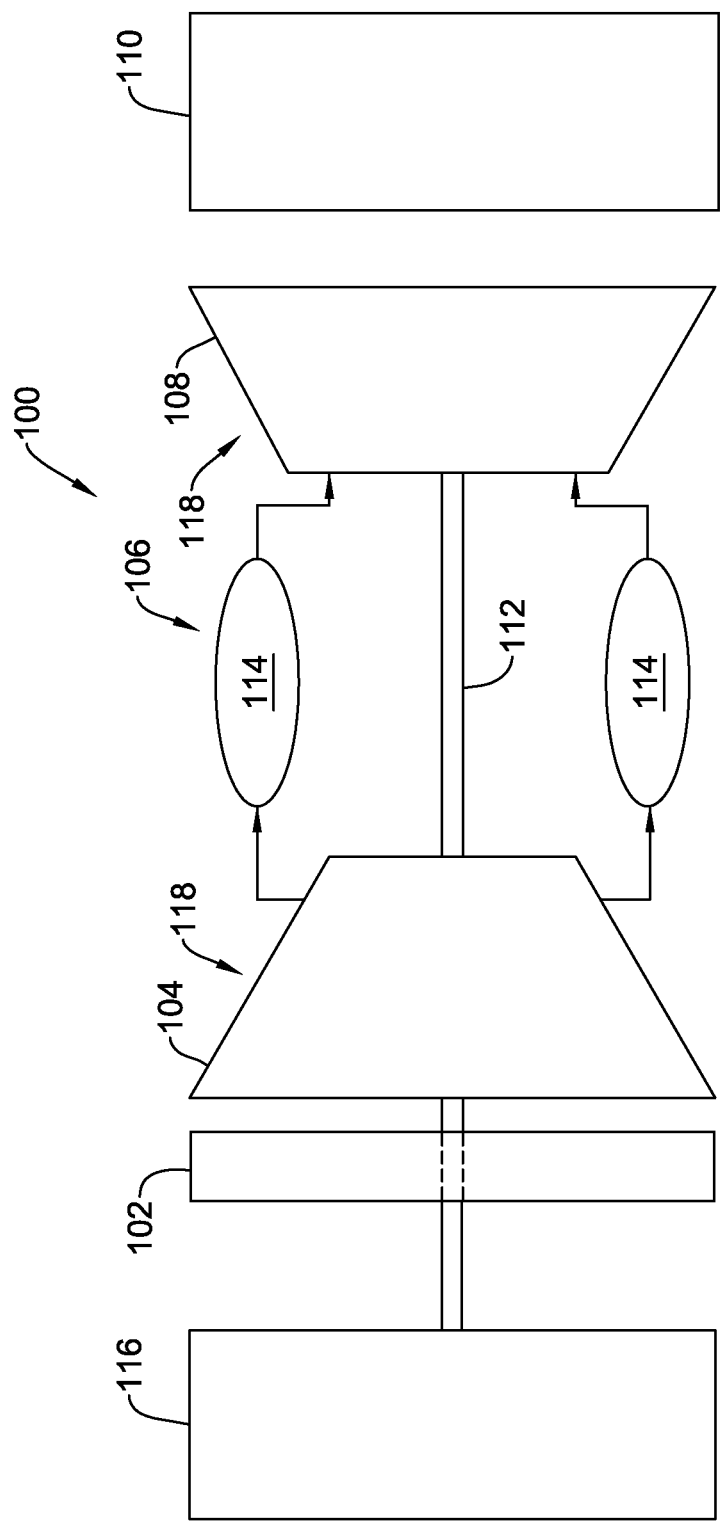
FIG. 1 is a schematic view of an exemplary rotary machine.

FIG. 1 is a schematic view of an exemplary rotary machine 100. In the exemplary embodiment, rotary machine 100 is a gas turbine engine. Alternatively, rotary machine 100 may be any other turbine engine and/or rotary machine, including, without limitation, a steam turbine engine, a gas turbofan aircraft engine, other aircraft engine, a wind turbine, a compressor, and a pump. In the exemplary embodiment, gas turbine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. In the exemplary embodiment, combustor section 106 includes a plurality of combustors 114. Combustor section 106 is coupled to compressor section 104 such that each combustor 114 is in flow communication with compressor section 104. Rotor shaft 112 is also coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

Figure 2:
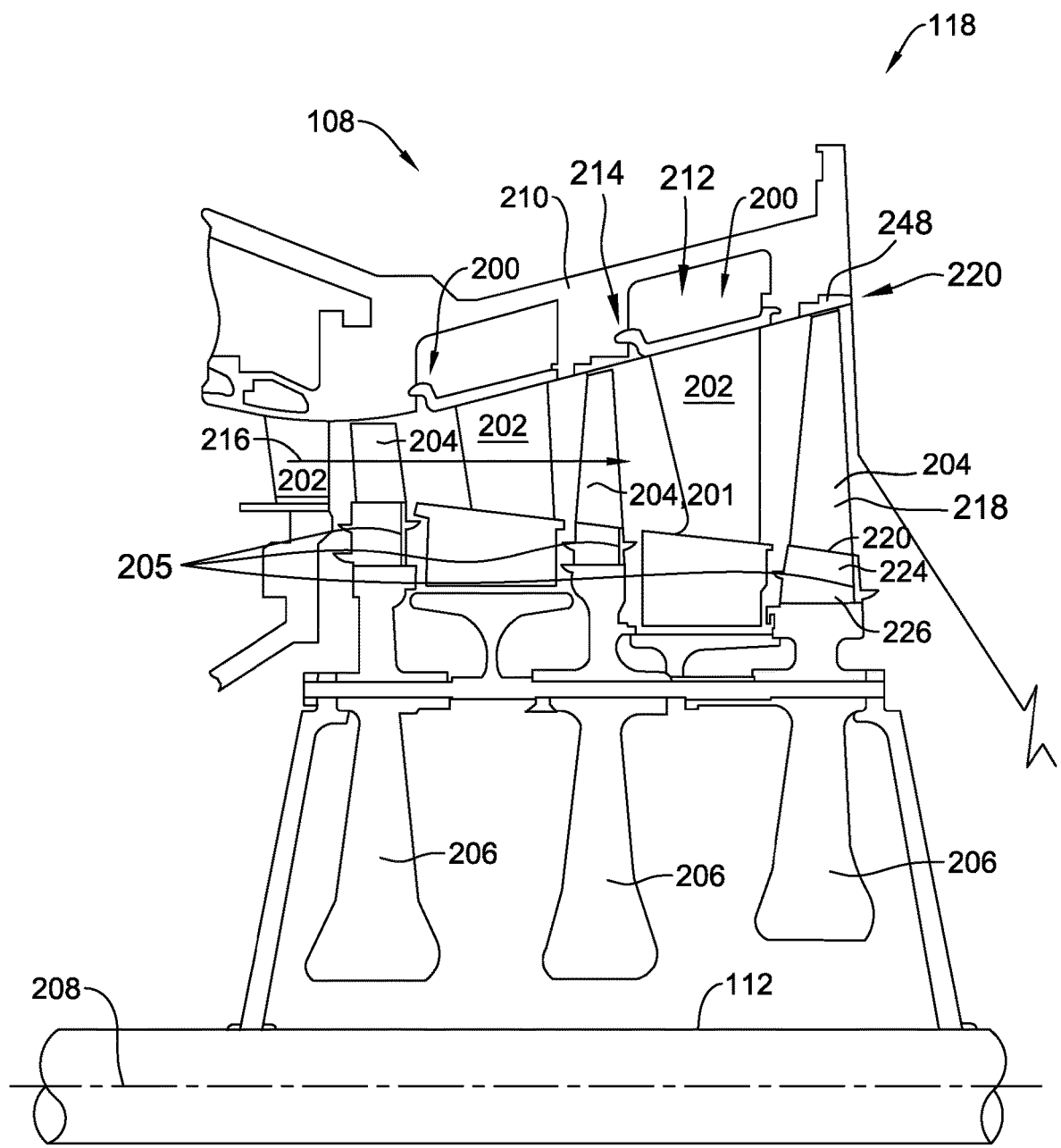
FIG. 2 is a partial sectional view of a portion of an exemplary rotor assembly that may be used with the rotary machine shown in FIG. 1.

FIG. 2 is a sectional view of a portion of an exemplary rotor assembly 118. In the exemplary embodiment, turbine section 108 includes a plurality of stages 200 that each include a row 212 of stator vanes 202, a row 214 of rotating blades 204, and a plurality of radial seals 205 positioned between adjacent pairs of rotary components 201. More specifically, in the exemplary embodiment, rotary components 201 are rotating blades 204. Alternatively, rotary components 201 may be any other rotating components of rotary machine 100 that enable radial seals 205 to function as described herein.

In the exemplary embodiment, blades 204 in each row 214 are spaced circumferentially about, and extend radially outward from, a rotor disk 206. Each rotor disk 206 is coupled to rotor shaft 112 and rotates about a centerline axis 208 defined by rotor shaft 112. Each blade 204 includes an airfoil 218 that extends radially between a tip end 248 and a root end 220. Each blade 204 also includes a platform 224 radially inward of root end 220, and a shank 226 radially inward of platform 224. Radial seals 205 extend radially between circumferentially adjacent blades 204 in row 214 or, alternatively, between any other circumferentially adjacent rotary components 201.

A casing 210 extends circumferentially about rotor assembly 118 and stator vanes 202. Stator vanes 202 are each coupled to turbine casing 210 and extend radially inward from casing 210 towards rotor shaft 112. A working fluid path 216 is defined radially inward of casing 210, and radially outward of platforms 224. Each row 214 of blades 204 and each row 212 of stator vanes 202 extends at least partially through working fluid path 216, such that each platform 224 of blades 204 forms at least a portion of a radially inner boundary of working fluid path 216.

With reference to FIGS. 1 and 2, during operation, intake section 102 channels air towards compressor section 104. Compressor section 104 compresses air and discharges compressed air into combustor section 106 and towards turbine section 108. The majority of air discharged from compressor section 104 is channeled towards combustor section 106. More specifically, pressurized compressed air is channeled to combustors 114 wherein the air is mixed with fuel and ignited to generate high temperature combustion gases. The combustion gases are channeled towards combustion gas path 216, wherein the gases impinge upon turbine blades 204 and stator vanes 202 to facilitate imparting a rotational force on rotor assembly 118.

Figure 3:
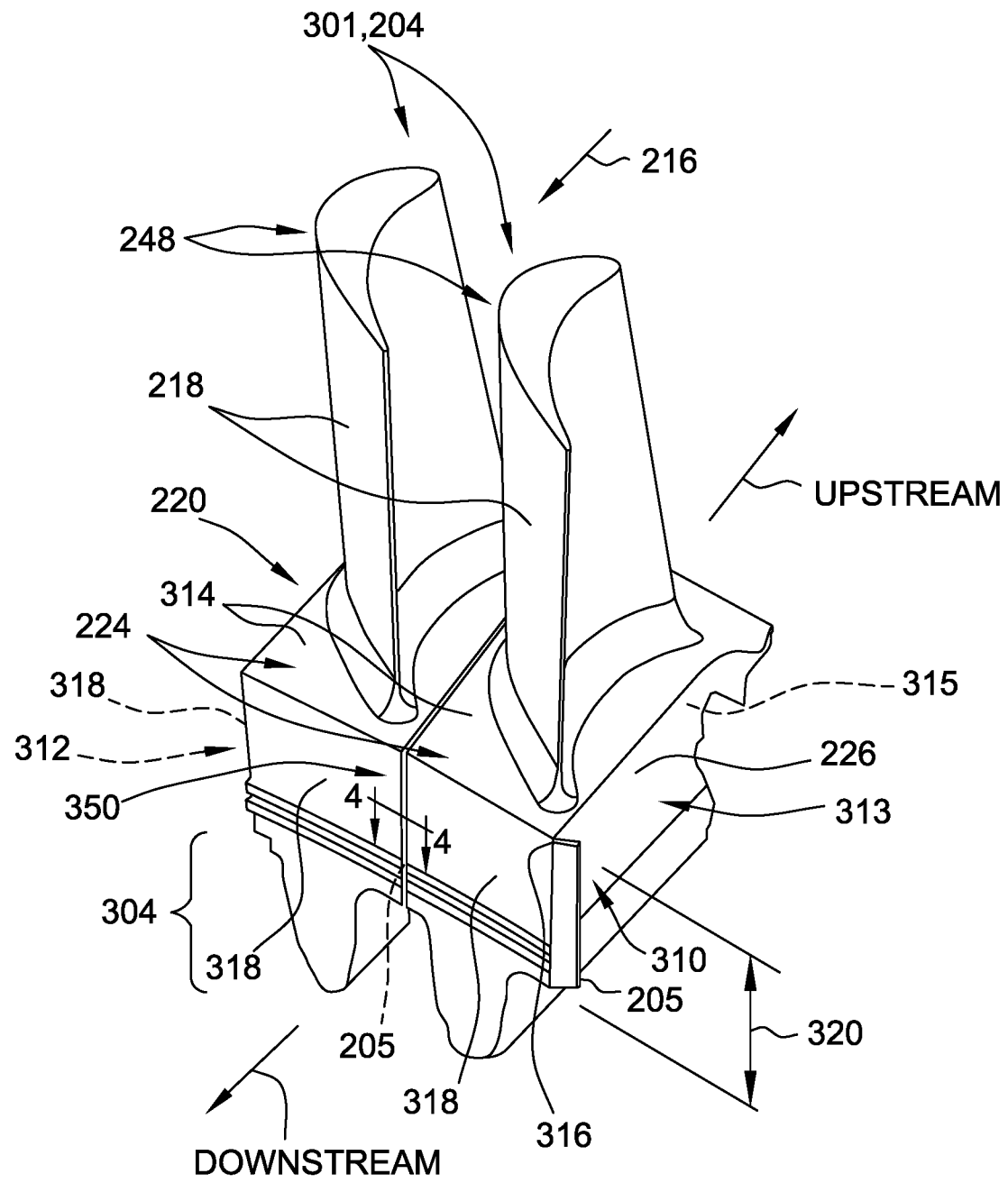
FIG. 3 is a perspective view of an exemplary pair of circumferentially adjacent rotary components that may be used with the rotor assembly shown in FIG. 2.
Figure 4:
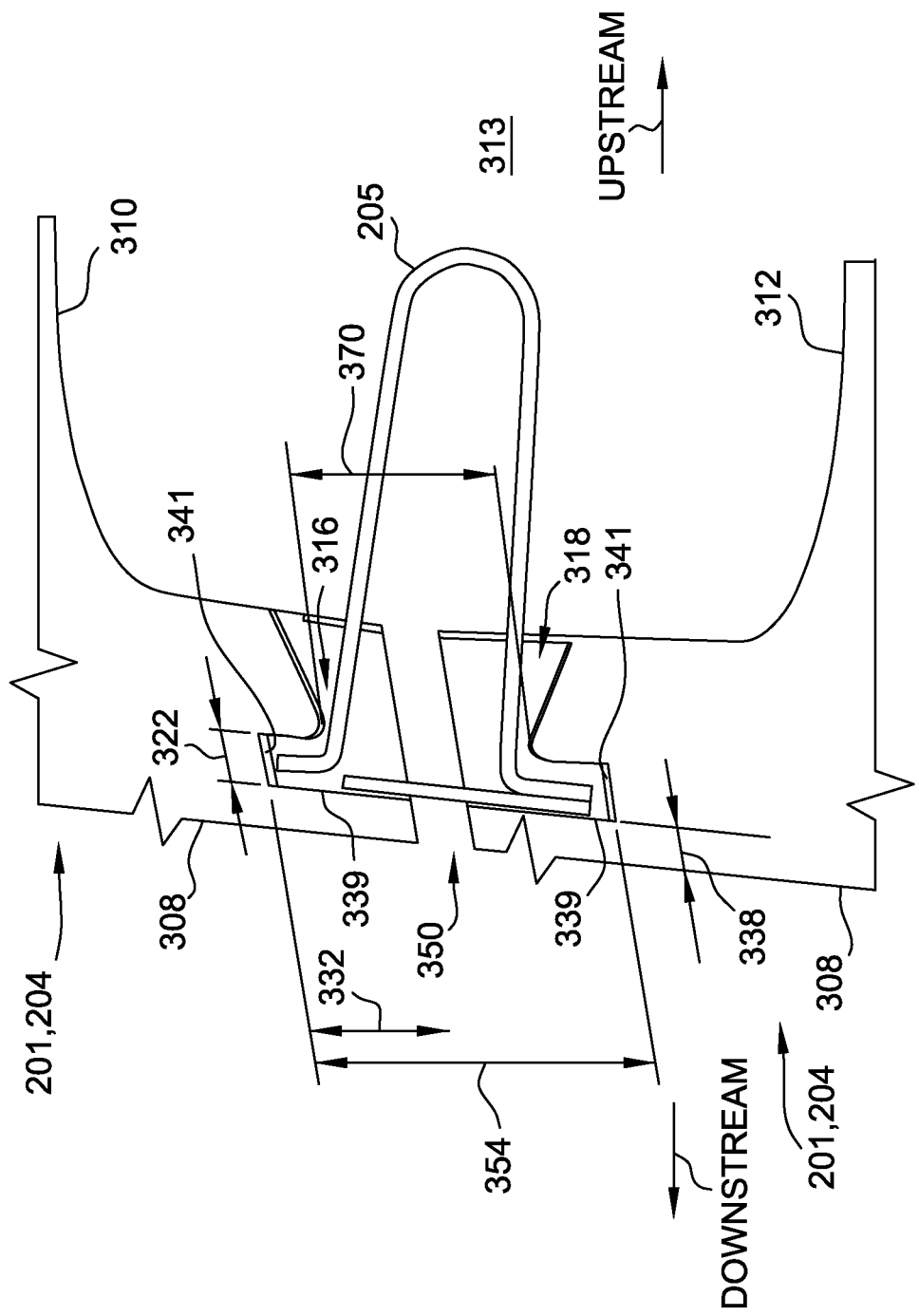
FIG. 4 is a partial sectional view of a portion of the pair of circumferentially adjacent rotary components shown in FIG. 3.

FIG. 3 is a perspective view of a pair of circumferentially adjacent exemplary rotary components 201 that may be used with rotor assembly 118 shown in FIG. 2. FIG. 4 is a partial sectional view of a portion of the pair of circumferentially adjacent rotary components 201 taken along lines 4-4 shown in FIG. 3. In the exemplary embodiment, rotary component 201 is blade 204. In another embodiment, rotary component 201 is any other component that enables rotary machine 100 to operate as described herein.

With reference to FIGS. 2-4, in the exemplary embodiment, each rotary component 201 further includes a dovetail region 304 that extends radially inwardly from shank 226. Dovetail region 304 is shaped to facilitate secure coupling of rotary component 201 to rotor disk 206. In alternative embodiments, dovetail region 304 has any suitable shape that enables rotary component 201 to function as described herein.

In the exemplary embodiment, each platform 224 includes a radially outer face 314 that is suitably shaped to facilitate flow of a working fluid through working fluid path 216, and a radially inner face 315. In the exemplary embodiment, each shank 226 includes a downstream face 308, a first side face 310, and an opposite second side face 312. First side face 310 and second side face 312 extend radially outwardly between dovetail region 304 and platform 224, and axially upstream from downstream face 308. In the exemplary embodiment, first side face 310 and second side face 312 are circumferentially recessed relative to platform 224, such that a cavity 313 is defined between first side face 310 of one shank 226 and second side face 312 of the adjacent shank 226. For example, cavity 313 receives a cooling fluid during operation of rotary machine 100.

First side face 310 defines a first side channel 316 that extends radially along first side face 310, proximate to downstream face 308. Similarly, second side face 312 defines an opposite second side channel 318 that extends radially along second side face 312, proximate to downstream face 308. In the exemplary embodiment, side channels 316 and 318 extend over substantially an entire radial distance between dovetail region 304 and platform 224 to facilitate sealing of cavity 313 proximate to downstream faces 308. In alternative embodiments, side channels 316 and 318 extend to any suitable radial extent between dovetail region 304 and platform 224 that enables radial seal 205 to function as described herein.

First side channel 316 and second side channel 318 each face, that is, are at least partially open toward, cavity 313. Each of first side channel 316 and second side channel 318 is oriented to interface with respective sides of a radial seal 205. More specifically, first side channel 316 of each rotary component 201 is configured to cooperate with second side channel 318 of a circumferentially adjacent rotary component 201 to receive a respective radial seal 205 therein. In alternative embodiments, rotary component 201 has any other suitable number of first side channels 316 and/or second side channels 318 that enables rotary component 201 to function as described herein.

In the exemplary embodiment, first side channel 316 extends a length 320 radially along first side face 310. Second side channel 318 also extends length 320 radially along second side face 312. An axially downstream wall 339 of first side channel 316 is spaced an axial distance 338 from downstream face 308. In the exemplary embodiment, axial distance 338 is non-variable along first side face 310. Similarly, axially downstream wall 339 of second side channel 318 is spaced axial distance 338 from downstream face 308 and the distance is non-variable along second side face 312. In the exemplary embodiment, axially downstream wall 339 is a substantially planar surface. In alternative embodiments, axially downstream wall 339 is at least one of an angled, sloped, chamfered, and radiused wall, as discussed further below. In alternative embodiments, each of first side channel 316 and second side channel 318 is spaced from downstream face 308 in any suitable fashion that enables rotary component 201 to function as described herein.

Each of first side channel 316 and second side channel 318 is defined by a circumferential depth 332, an axial width 322, and radial length 320. In the exemplary embodiment, each of first side channel 316 and second side channel 318 extends radially outwardly from adjacent to dovetail region 304 by length 320 to an intersection with platform 224. In alternative embodiments, each of first side channel 316 and second side channel 318 extends radially to any suitable extent along shank 226 that enables radial seal 205 to function as described herein. In other alternative embodiments, each of first side channel 316 and second side channel 318 has any other suitable shape and size that enables rotary component 201 to function as described herein.

In the exemplary embodiment, side channels 316 and 318 of circumferentially adjacent rotary components 201 assembled as part of row 214 cooperate to define a circumferential seal channel width 354, measured at a downstream end of first and second side channels 316 and 318. A circumferential channel entry width 370 is defined at an opposite upstream end of side channels 316 and 318. In the exemplary embodiment, channel entry width 370 is less than seal channel width 354.

Figure 5:
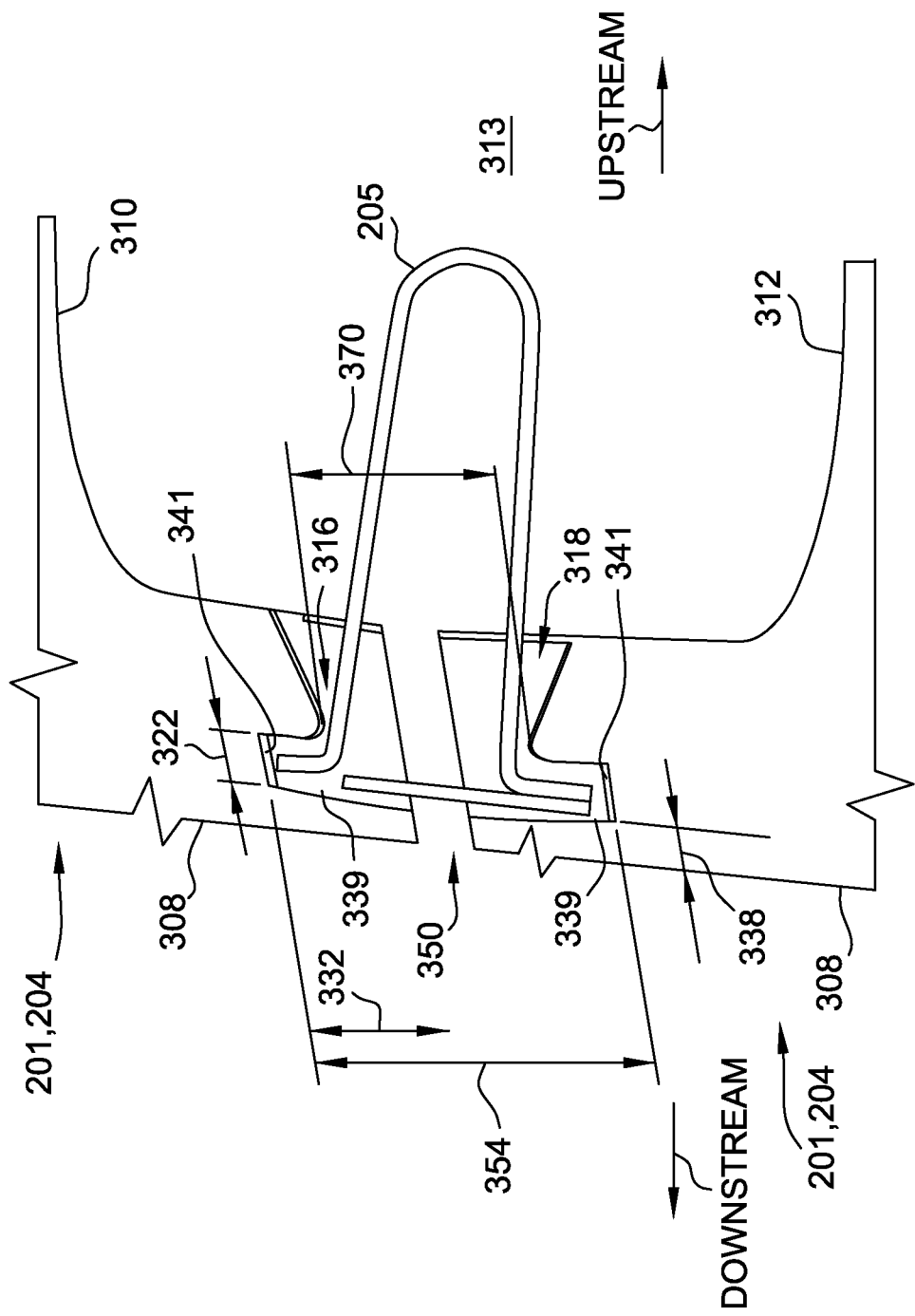
FIG. 5 is a partial sectional view of an alternative embodiment of the portion of the pair of circumferentially adjacent rotary components shown in FIG. 4 illustrating a chamfered downstream wall.

FIG. 5 is a partial sectional view of an alternative embodiment of the portion of pair of circumferentially adjacent rotary components 201 (shown in FIG. 4) illustrating a chamfered downstream wall 339. The embodiment shown in FIG. 5 is substantially identical to the embodiment shown in FIG. 4, except for the presence of a sloped downstream wall 339. In the exemplary embodiment, each downstream wall 339 is sloped axially downstream between the intersection of downstream wall 339 and circumferential edge 341 and the intersection of downstream wall 339 and gap 350. Sloped downstream wall 339 facilitates reducing the surface area of downstream wall that is in contact with bridge member 428. The reduced contact surface area between bridge member 428 and each downstream wall 339 facilitates increasing the sealing pressure between bridge member 428 and each downstream wall 339 during operation of rotary machine 100. In alternative embodiments, downstream wall 339 may have any suitable shape, size, and configuration that enables rotary components 201 to function as described herein.

Figure 6:
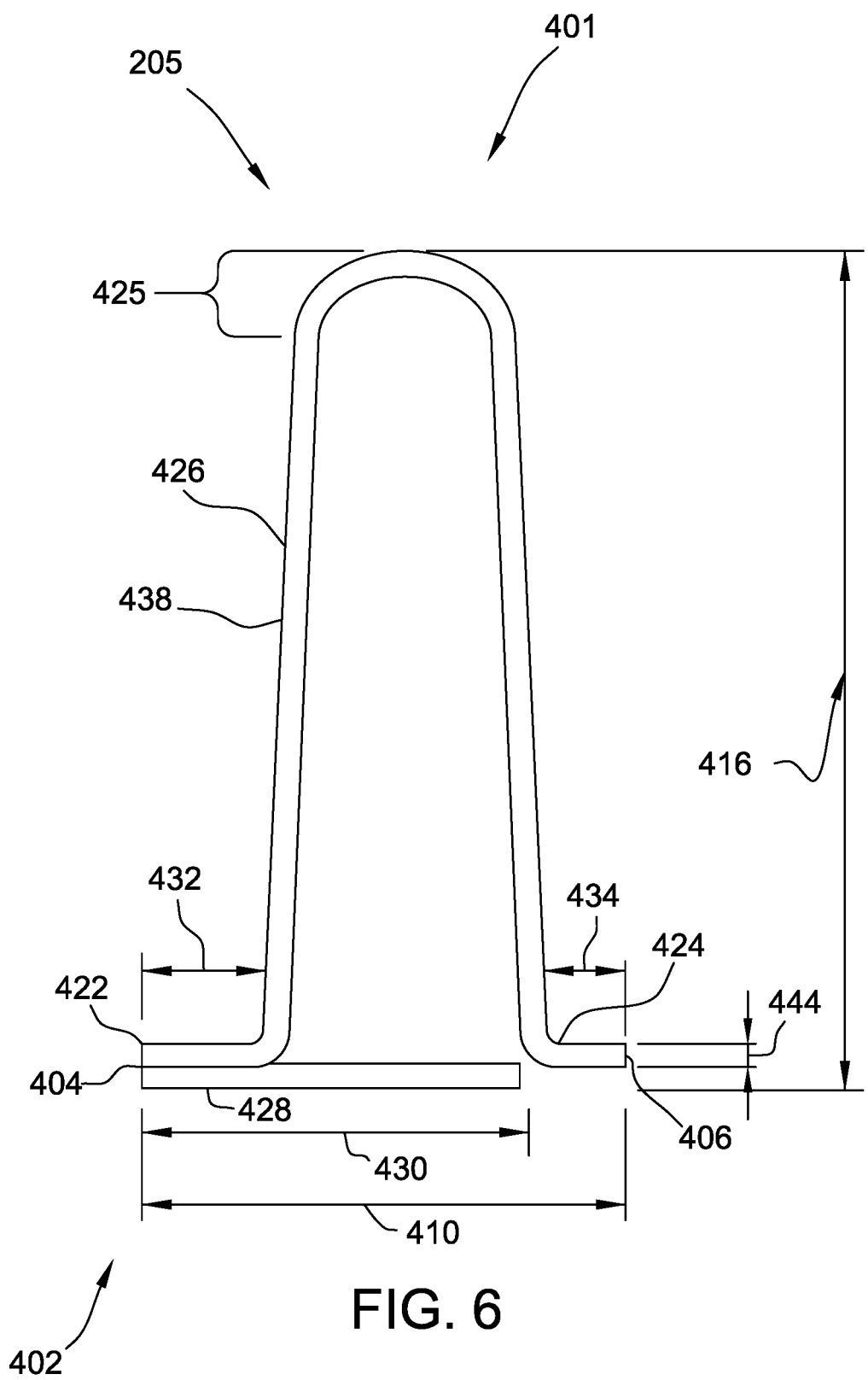
FIG. 6 is a cross-section of an exemplary radial seal that may be used with the rotor assembly shown in FIG. 2.
Figure 7:
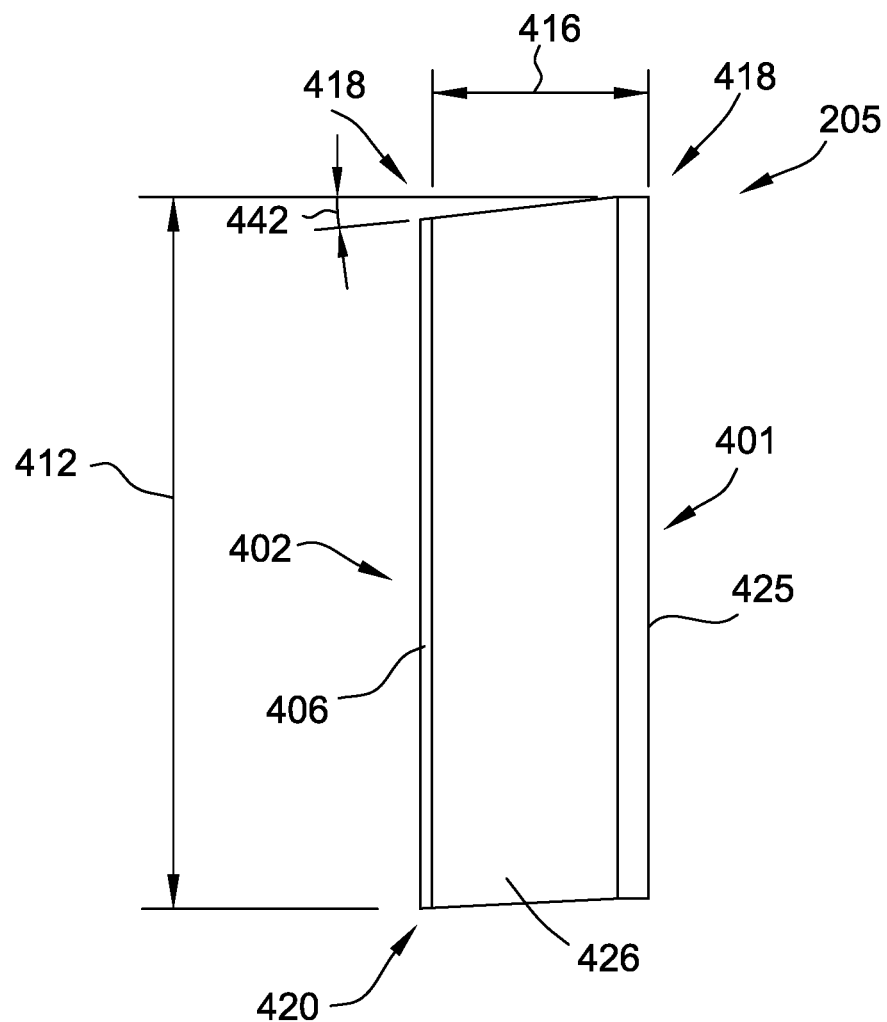
FIG. 7 is a side view of the radial seal shown in FIG. 6.
Figure 8:
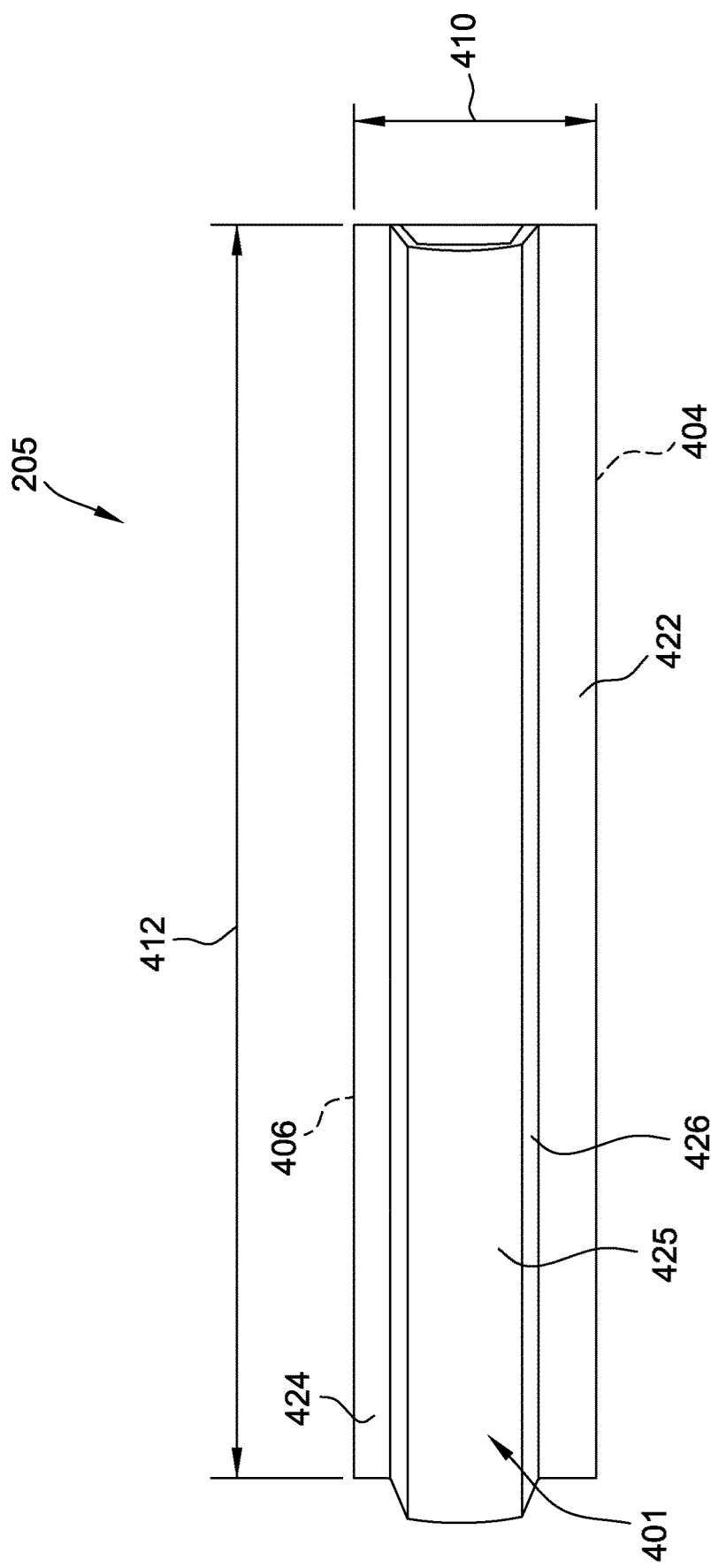
FIG. 8 is a plan view of the radial seal shown in FIG. 6.

FIG. 6 is a cross-section of an exemplary embodiment of radial seal 205 that may be used with rotor assembly 118 (shown in FIG. 2). FIG. 7 is a side view of radial seal 205, and FIG. 8 is a plan view of radial seal 205. With reference to FIGS. 4-8, in the exemplary embodiment, radial seal 205 is sized and shaped to be retained by, and to extend between, first side channel 316 of a first rotary component 201 and second side channel 318 of an adjacent second rotary component 201. In the exemplary embodiment, radial seal 205 includes a first leg 422, a second leg 424, and a body 426 extending therebetween. Body 426 includes U-shaped portion 425 located generally centrally between first leg 422 and second leg 424. Radial seal 205 further includes a generally planar bridge member 428 coupled to one of first leg member 422 and second leg member 424 opposite body 426. In alternative embodiments, bridge member 428 may have any suitable shape, size, and/or configuration, including, without limitation, curved, as described below in further detail, that enables rotary components 201 to function as described herein. In the exemplary embodiment, each of first leg 422, second leg 424, and bridge member 428 has an approximately uniform thickness 444. In an alternative embodiment, each of first leg 422, second leg 424, and bridge member 428 may have a non-uniform thickness 444. In alternative embodiments, radial seal 205 may have any suitable shape, size, and/or configuration that enables rotary components 201 to function as described herein.

In the exemplary embodiment, each of first leg 422 and second leg 424 is configured to interface with a respective one of first side channel 316 and second side channel 318 of circumferentially adjacent rotary components 201 to facilitate retaining radial seal 205 across a gap 350 defined between downstream faces 308 of shanks 226 of adjacent components 201. First leg 422 extends laterally from body 426 and has a width 432. Second leg 424 extends laterally opposite first leg 422 and has a width 434. In the exemplary embodiment, first leg 422, second leg 424, and body 426 are integrally formed from a single, continuous material having a predetermined flexibility. In alternative embodiments, first leg 422, second leg 424, and body 426 are formed from separate pieces of material and are coupled together in any suitable fashion, such as by at least one of soldering, welding, bolting, and fastening. In alternative embodiments, each of first leg 422, second leg 424, and body 426 has any suitable shape, size, and/or configuration that enables rotary components 201 to function as described herein.

Body 426 is configured to extend axially upstream within cavity 313 between adjacent shanks 226 of circumferentially adjacent rotary components 201 when each of first leg member 422 and second leg member 424 is inserted into a respective one of first side channel 316 and second side channel 318. Bridge member 428 is sized and shaped to sealingly interface with downstream wall 339 of each of first side channel 316 and second side channel 318. In the example embodiment, bridge member 428 is integrally formed with first leg member 422, and extends laterally parallel to first leg 422 towards second leg 424. Alternatively, bridge member 428 is integrally formed with second leg 424 and extends laterally parallel to second leg 424 towards first leg 422. In alternative embodiments, bridge member 428 is separately formed and is coupled to one of first leg member 422 and second leg member 424 by at least one of soldering, welding, fastening with fasteners, and other means of mechanically joining.

In the example embodiment, when retained in channels 316 and 318, radial seal 205 extends axially from a downstream end 402 to an upstream end 401 and defines an axial length 416 therebetween. In addition, radial seal 205 extends radially from a radially inner end 420 to a radially outer end 418 and defines a height 412 therebetween. In the exemplary embodiment, seal height 412 is approximately equal to radial length 320 of channels 316 and 318 to facilitate retaining radial seal 205 within the pair of recessed channels 316 and 318 defined in circumferentially adjacent rotary components 201.

Before installation, radial seal 205 extends circumferentially from a first leg edge 404 to a second leg edge 406 and defines a resting width 410 (i.e., a non-deformed width) therebetween. In the exemplary embodiment, body 426 is resiliently deformable inwardly from resting width 410, such that legs 422 and 424 move toward each other and are receivable through channel entry width 370 during installation. Moreover, after insertion through channel entry width 370, body 426 is released such that legs 422 and 424 spring back towards resting width 410, such that radial seal 205 extends across seal channel width 354 after insertion through entry width 370. Further, in the exemplary embodiment, resting width 410 is less than seal channel width 354, such that seal 205 is free to move within first side channel 316 and second side channel 318 after installation to facilitate bridge member 428 sealingly interfacing with each downstream face 339 of each of first side channel 316 and second side channel 318. Additionally, resting width 410 facilitates routine movement of radial seal 205 relative to circumferentially adjacent rotary components 201, while reducing or eliminating binding of radial seal 205 during operation of rotary machine 100, thereby facilitating improved sealing between bridge member 428 and each downstream face 339 of each of first side channel 316 and second side channel 318.

Bridge member 428 has a width 430. In some embodiments, width 430 is less than channel entry width 370 to enable radial seal 205 to pass through channel entry width 370 during installation without significant deformation of bridge member 428. Thus, bridge member 428 may be thicker and/or less flexible than body 426. In alternative embodiments, width 430 is equal to or greater than channel entry width 370 and radial seal 205 may be inserted at an angle relative to an axially upstream direction. In alternative embodiments, bridge member 428 is deformable to facilitate passage through channel entry width 370. In the exemplary embodiment, width 430 is also sufficiently large to enable bridge member 428 to extend across gap 350 after legs 422 and 424 spring back to extend across seal channel width 354.

In the exemplary embodiment, radially outer end 418 of radial seal 205 is sloped radially inward between upstream end 401 and downstream end 402, such that an angle 442 is defined between radially outer end 418 and the axial direction. During operation of rotary machine 100, a centrifugal force on radial seal 205 tends to force radial seal 205 radially outward, and radially outer end 418 of U-shaped portion 425 facilitates accommodation of the centrifugal load by U-shaped portion 425 of body 426 bearing against radially inner faces 315 of platforms 224 of adjacent rotary components 201. U-shaped portion 425 is configured to accommodate the centrifugal loading without buckling. In alternative embodiments, radially outer end 418 of radial seal 205 is other than sloped radially inward between upstream end 401 and downstream end 402. Moreover, in some embodiments, radially inner end 420 of radial seal 205 is similarly sloped radially inward between upstream end 401 and downstream end 402.

In the exemplary embodiment, radial seal 205 is inserted into first side channel 316 of a first rotary component 201 and second side channel 318 of a circumferentially adjacent second rotary component 201 from an axially upstream direction. More specifically, radial seal 205 is inserted between shank first side face 310 of first rotary component 201 and shank second side face 312 of second rotary component 201. In some embodiments, radial seal 205 is inserted after all of the rotary components 201 in row 214 are coupled together, for example by coupling to rotor disk 206 (shown in FIG. 2). First side edge 404 of first leg member 422 and bridge member 428 are inserted into, and sealingly interfaces with, second side channel 318 of a first rotary component 201, and second leg member edge 406 of second leg member 424 is inserted into first side channel 316 of an adjacent second rotary component 201. Bridge member 428 extends between second side channel 318 of first rotary component 201 and first side channel 316 of adjacent second rotary component 201, and sealing interfaces with each downstream wall 339 of each of first side channel 316 and second side channel 318, and gap 350.

Figure 9:
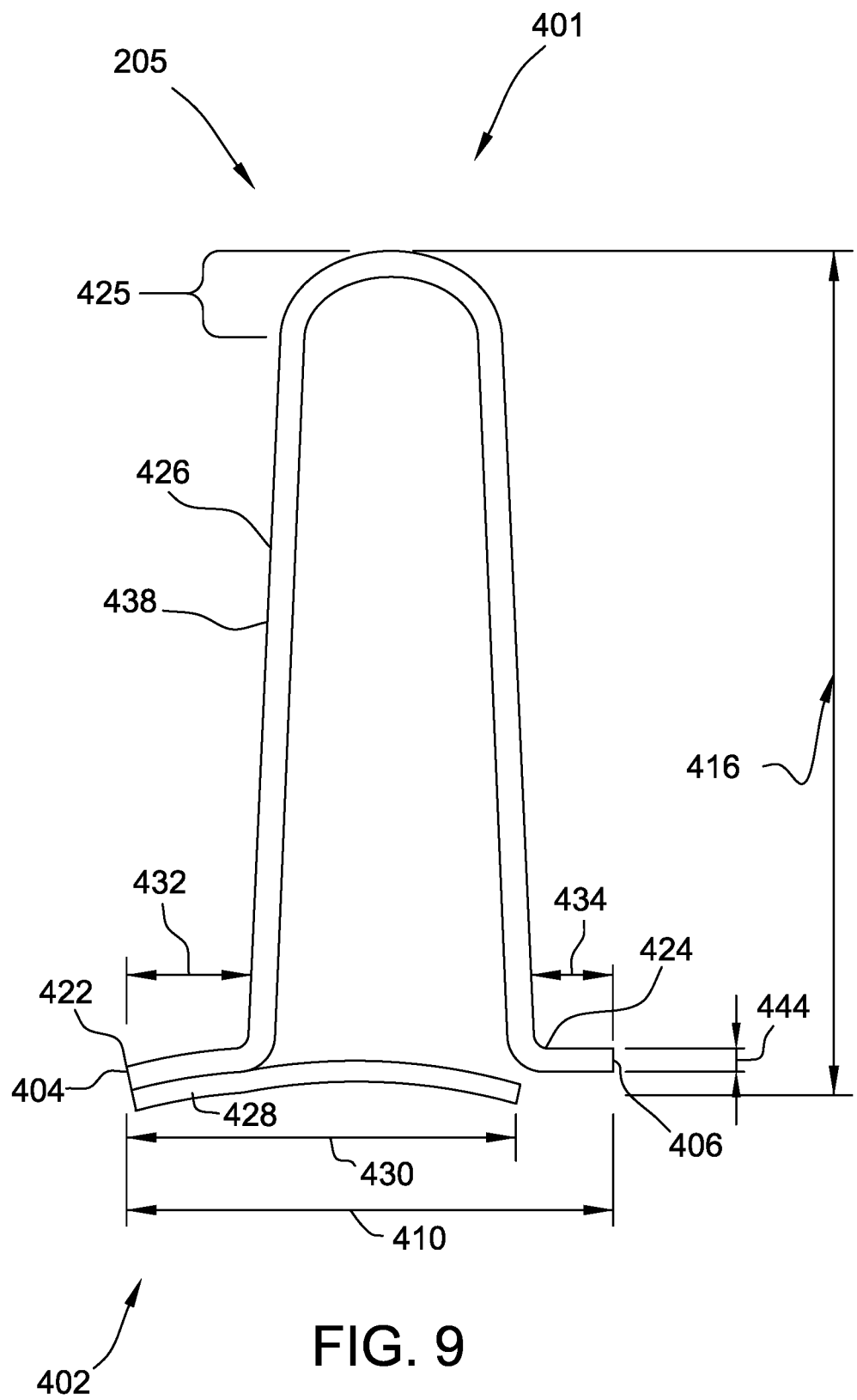
FIG. 9 is a cross-section of an alternative embodiment of the exemplary radial seal shown in FIG. 6 illustrating a curved bridge member.

FIG. 9 is a cross-section of an alternative embodiment of radial seal 205 (shown in FIG. 6) illustrating a curved bridge member 428. The embodiment shown in FIG. 9 is substantially identical to the embodiment shown in FIG. 6, except bridge member 428 is of an arcuate shape. In the exemplary embodiment, bridge member 428 is curved such that a portion of bridge member 428 extends axially upstream and each end of bridge member 428 is in contact with a respective downstream wall 339 when seal 205 is inserted and assembled between adjacent rotary components 201. The limited surface area of bridge member 428 that is in contact with each respective downstream wall 339 when in the assembled position facilitates higher sealing forces at the points of contact during operation of rotary machine 100. In alternative embodiments, bridge member 428 may have any suitable shape, size, and configuration that enables rotary components 201 to function as described herein.

Figure 10:
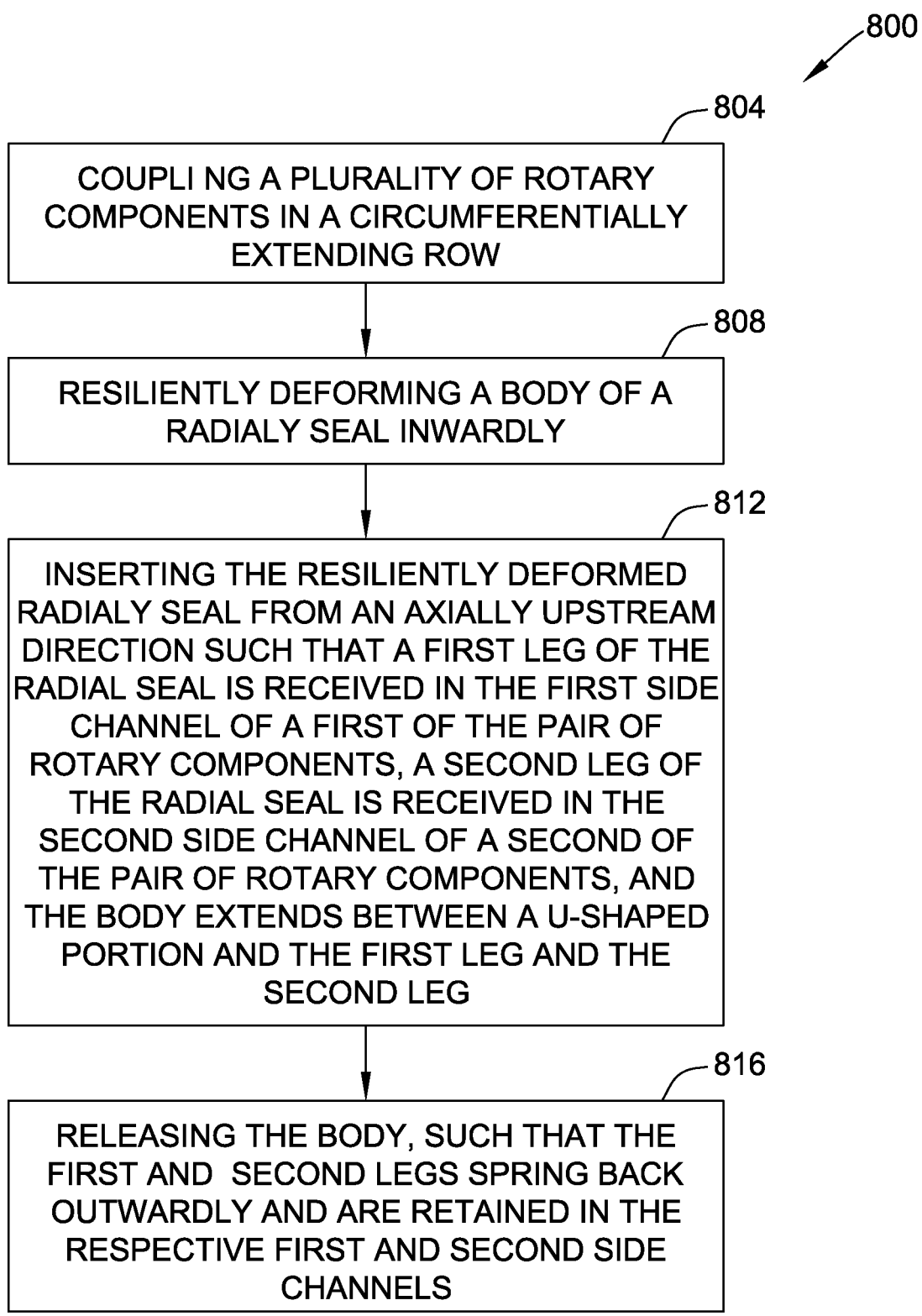
FIG. 10 is a flow diagram of an exemplary method of assembling a rotor assembly, such as the rotor assembly shown in FIG. 2.

FIG. 10 is a flow diagram of an exemplary method 800 of assembling a rotor assembly, such as rotor assembly 118 (shown in FIG. 2). In the exemplary embodiment, method 800 includes coupling 804 a plurality of rotary components 201, such as blades 204, in a circumferentially extending row, such as row 214. Each rotary component includes a platform, such as platform 224, and a shank, such as shank 226, extending radially inwardly from the platform. The shank includes a radially extending first side channel and an opposite radially extending second side channel, such as first side channel 316 and second side channel 318. Method 800 also includes resiliently deforming 808 a body of a radial seal, such as body 426 of radial seal 205, inwardly and inserting 812 the resiliently deformed radial seal from an axially upstream direction such that a first leg of the radial seal, such as first leg 422, is received in the first side channel of a first of the pair of rotary components, a second leg of the radial seal, such as second leg 424, is received in the second side channel of a second of the pair of rotary components, and the body extends therebetween. Method 800 further includes releasing 816 the body, such that the first and second legs spring back outwardly and are retained in the respective first and second side channels.

In some embodiments, the first and second side channels cooperate to define circumferential seal channel width 354 at a downstream end of the first and second side channels and circumferential channel entry width 370 at an opposite upstream end of the first and second side channels, the channel entry width is less than or substantially similar to the seal channel width, the radial seal has circumferential resting width 410 substantially similar to the seal channel width, and the step of resiliently deforming 808 the body of the radial seal includes resiliently deforming the radial seal to a width less than the channel entry width, such that the first and second legs are receivable through the channel entry width.

In certain embodiments, the step of inserting 812 the resiliently deformed radial seal from the axially upstream direction is performed after assembly of the circumferentially extending row of the plurality of rotary components. For example, radial seal 205 is inserted after all of the rotary components 201 in row 214 are coupled together, for example by coupling to rotor disk 206 (shown in FIG. 2).

In some embodiments, the shank further includes a first side face, an opposite second side face, and a downstream face, such as first and second side faces 310 and 312 and downstream face 308; the first side channel is defined in the first side face proximate to the downstream face; the second side channel is defined in the second side face proximate to the downstream face; the body includes a U-shaped cross-section; and the step of inserting 812 the resiliently deformed radial seal includes orienting the body to extend axially upstream into a cavity, such as cavity 313, defined between the first side face of the first rotary component and the second side face of the second rotary component.

The above-described embodiments of rotary components having radial seals overcome at least some disadvantages of known rotary components. Specifically, the rotary components each include a first side channel and a second side channel, and the first and second side channels of circumferentially adjacent rotary components cooperate to retain, and sealingly interface with, the radial seal to facilitate reducing working fluid leakage between the circumferentially adjacent rotary components. Also specifically, in at least some embodiments, working fluid leakage reduction is achieved without modifying the existing rotor disk and/or rows of axially adjacent rotary components, such as rotor blades and axial spacers. Also specifically, the radial seal includes a resiliently deformable body, such that in certain embodiments, the radial seal may be installed and/or removed from individual rotary components after the row of rotary components has been assembled.

Exemplary embodiments of a sealing system and rotor assembly, and methods of assembling the same, are described above in detail. The systems and methods are not limited to the specific embodiments described herein, but rather, components of systems and/or steps of methods may be utilized independently and separately from other components and/or steps described herein. For example, the system may also be used in combination with other rotary machines and methods, and is not limited to practice with only a gas turbine engine assembly as described herein. Rather, the embodiments can be implemented and utilized in connection with many other rotary machine applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various aspects and embodiments of the present invention are defined by the following numbered clauses:

1. A sealing system for a rotary machine, said sealing system comprising:
   a pair of circumferentially adjacent rotary components, each of said rotary components comprising:
      a platform; and
      a shank extending radially inwardly from said platform, said shank comprising a radially extending first side channel and an opposite radially extending second side channel; and
   a radial seal comprising a first leg received in said first side channel of a first of said pair of rotary components, a second leg received in said second side channel of a second of said pair of rotary components, and a resiliently deformable body extending therebetween, said body comprising a U-shaped portion located generally centrally between said first leg and said second leg.

2. The sealing system according to clause 1, wherein said first leg, said second leg, and said body are integrally formed.

3. The sealing system according to any preceding clause, wherein at least one of said first leg, said second leg, and said body is other than integrally formed.

4. The sealing system according to any preceding clause, wherein said shank further comprises a first side face, an opposite second side face, and a downstream face, said first side channel defined in said first side face proximate to said downstream face, and said second side channel defined in said second side face proximate to said downstream face.

5. The sealing system according to any preceding clause, wherein said first side face of said first rotary component and said second side face of said second rotary component define a cavity therebetween, said first side channel and said second side channel facing said cavity.

6. The sealing system according to any preceding clause, wherein said body comprises a U-shaped cross-section that extends into said cavity.

7. The sealing system according to any preceding clause, wherein said radial seal extends axially from a downstream end to an upstream end, and wherein a radially outer end of said radial seal is sloped radially inward between said upstream end and said downstream end.

8. The sealing system according to any preceding clause, wherein said radial seal further comprises a generally planar bridge member coupled to one of said first leg and said second leg and extending towards the other of said first leg and said second leg.

9. The sealing system according to any preceding clause, wherein:
said first and second side channels cooperate to define a circumferential seal channel width at a downstream end of said first and second side channels and a circumferential channel entry width at an opposite upstream end of said first and second side channels, said channel entry width is less than said seal channel width,
said radial seal has a circumferential resting width greater than said channel entry width, and
said body is resiliently deformable inwardly such that said first and second legs are receivable through said channel entry width.

10. A rotor assembly for a rotary machine comprising:
a row of rotary components spaced circumferentially about a rotor disk, each rotary component of said row of rotary components comprising:
a platform; and
a shank extending radially inwardly from said platform, said shank comprising a radially extending first side channel and an opposite radially extending second side channel; and
a radial seal comprising a first leg received in said first side channel of a first of said pair of rotary components, a second leg received in said second side channel of a second of said pair of rotary components, and a resiliently deformable body extending therebetween, said body comprising a U-shaped portion located generally centrally between said first leg and said second leg.

11. The rotor assembly of any preceding clause, wherein said first leg, said second leg, and said body are integrally formed.

12. The rotor assembly of any preceding clause, wherein at least one of said first leg, said second leg, and said body is other than integrally formed.

13. The rotor assembly of any preceding clause, wherein said shank further comprises a first side face, an opposite second side face, and a downstream face, said first side channel defined in said first side face proximate to said downstream face, and said second side channel defined in said second side face proximate to said downstream face.

14. The rotor assembly of any preceding clause, wherein said first side face of said one rotary component and said second side face of said adjacent rotary component define a cavity therebetween, said first side channel and said second side channel facing said cavity.

15. The rotor assembly of any preceding clause, wherein said body comprises a U-shaped cross-section that extends into said cavity.

16. The rotor assembly of any preceding clause, wherein said radial seal extends axially from a downstream end to an upstream end, and wherein a radially outer end of said radial seal is sloped radially inward between said upstream end and said downstream end.

17. The rotor assembly of any preceding clause, wherein said radial seal further comprises a generally planar bridge member coupled to one of said first leg and said second leg and extending towards the other of said first leg and said second leg.

18. The rotor assembly of any preceding clause, wherein:
said first and second side channels cooperate to define a circumferential seal channel width at a downstream end of said first and second side channels and a circumferential channel entry width at an opposite upstream end of said first and second side channels, said channel entry width is less than said seal channel width,
said radial seal has a circumferential resting width greater than said channel entry width, and
said body is resiliently deformable inwardly such that said first and second legs are receivable through said channel entry width.

19. A method of assembling a rotor assembly, said method comprising:
coupling a pair of rotary components circumferentially adjacent to each other in a circumferentially extending row of a plurality of rotary components, wherein each of the pair of rotary components includes a platform and a shank extending radially inwardly from the platform, the shank including a radially extending first side channel and an opposite radially extending second side channel;
resiliently deforming a body of a radial seal inwardly;
inserting the resiliently deformed radial seal from an axially upstream direction such that a first leg of the radial seal is received in the first side channel of a first of the pair of rotary components, a second leg of the radial seal is received in the second side channel of a second of the pair of rotary components, and the body extends therebetween, the body including a U-shaped portion located generally centrally between the first leg and the second leg; and
releasing the body, such that the first and second legs spring back outwardly and are retained in the respective first and second side channels.

20. The method of any preceding clause, wherein:
the first and second side channels cooperate to define a circumferential seal channel width at a downstream end of the first and second side channels and a circumferential channel entry width at an opposite upstream end of the first and second side channels,
the channel entry width is less than the seal channel width,
the radial seal has a circumferential resting width greater than the channel entry width, and
said resiliently deforming the body of the radial seal comprises resiliently deforming the radial seal to a width less than the channel entry width, such that the first and second legs are receivable through the channel entry width.

21. The method of any preceding clause, wherein said inserting the resiliently deformed radial seal from the axially upstream direction is performed after assembly of the circumferentially extending row of the plurality of rotary components.

22. The method of any preceding clause, wherein:
the shank further includes a first side face, an opposite second side face, and a downstream face, the first side channel defined in the first side face proximate to the downstream face, and the second side channel defined in the second side face proximate to the downstream face, and
said inserting the resiliently deformed radial seal comprises orienting the body to extend axially upstream into a cavity defined between the first side face of the first rotary component and the second side face of the second rotary component.

The invention claimed is:
1. A sealing system for a rotary machine, said sealing system comprising:
a pair of circumferentially adjacent rotary components, said pair of rotary components comprising a first rotary component and a second rotary component, each of said pair of rotary components comprising:
a platform; and a shank extending radially inwardly from said platform, said shank comprising a radially extending first side channel and an opposite radially extending second side channel, said first and second side channels cooperate to define a circumferential seal channel width at a downstream end of said first and second side channels and a circumferential channel entry width at an opposite upstream end of said first and second side channels, said channel entry width is smaller than said seal channel width; and
a radial seal comprising a first leg received in said first side channel of said first rotary component, a second leg received in said second side channel of said second rotary component, and a resiliently deformable body extending therebetween, said body comprising a U-shaped portion located generally centrally between said first and second legs.

2. The sealing system according to claim 1, wherein said first leg, said second leg, and said body are integrally formed.

3. The sealing system according to claim 1, wherein at least one of said first leg, said second leg, and said body is not formed integrally.

4. The sealing system according to claim 1, wherein each of said shanks further comprises a first side face, an opposite second side face, and a downstream face, said first side channel defined in said first side face proximate to said downstream face, and said second side channel defined in said second side face proximate to said downstream face.

5. The sealing system according to claim 4, wherein said first side face of said first rotary component and said second side face of said second rotary component define a cavity therebetween, said first side channel and said second side channel facing said cavity.

6. The sealing system according to claim 5, wherein said body comprises a U-shaped cross-section that extends into said cavity.

7. The sealing system according to claim 1, wherein said radial seal extends axially from a downstream seal end to an upstream seal end, and wherein a radially outer end of said radial seal is sloped radially inward between said upstream seal end and said downstream seal end.

8. The sealing system according to claim 1, wherein said radial seal further comprises a generally planar bridge member coupled to one of said first leg and said second leg and extending towards the other of said first leg and said second leg.

9. The sealing system according to claim 1, wherein,
said radial seal has a circumferential resting width wider than said channel entry width, and
said body is resiliently deformable such that said first and second legs move toward each other and are receivable through said channel entry width.

10. A rotor assembly for a rotary machine comprising:
a row of a plurality of rotary components spaced circumferentially about a rotor disk, said plurality of rotary components comprising at least a first rotary component and a second rotary component, each of said plurality of rotary components comprising:
a platform; and
a shank extending radially inwardly from said platform, said shank comprising a radially extending first side channel and an opposite radially extending second side channel, the first and second side channels cooperate to define a circumferential seal channel width at a downstream end of said first and second side channels and a circumferential channel entry width at an opposite upstream end of said first and second side channels, said channel entry width is smaller than said seal channel width; and
a radial seal comprising a first leg received in said first side channel of said first rotary component, a second leg received in said second side channel of said second rotary component, and a resiliently deformable body extending therebetween, said body comprising a U-shaped portion located generally centrally between said first and second legs.

11. The rotor assembly of claim 10, wherein said first leg, said second leg, and said body are integrally formed.

12. The rotor assembly of claim 10, wherein at least one of said first leg, said second leg, and said body is not formed integrally.

13. The rotor assembly of claim 10, wherein each of said shanks further comprises a first side face, an opposite second side face, and a downstream face, said first side channel defined in said first side face proximate to said downstream face, and said second side channel defined in said second side face proximate to said downstream face.

14. The rotor assembly of claim 13, wherein said first side face of said first rotary component and said second side face of said second rotary component define a cavity therebetween, said first side channel and said second side channel facing said cavity.

15. The rotor assembly of claim 14, wherein said body comprises a U-shaped cross-section that extends into said cavity.

16. The rotor assembly of claim 10, wherein said radial seal extends axially from a downstream seal end to an upstream seal end, and wherein a radially outer end of said radial seal is sloped radially inward between said upstream seal end and said downstream seal end.

17. The rotor assembly of claim 10, wherein said radial seal further comprises a generally planar bridge member coupled to one of said first leg and said second leg and extending towards the other of said first leg and said second leg.

18. The rotor assembly of claim 10, wherein:
said radial seal has a circumferential resting width wider than said channel entry width, and
said body is resiliently deformable such that said first and second legs move toward each other and are receivable through said channel entry width.

19. A method of assembling a rotor assembly, said method comprising:
coupling a pair of rotary components circumferentially adjacent to each other in a circumferentially extending row of a plurality of rotary components, the pair of rotary components including a first rotary component and a second rotary component, wherein each of the pair of rotary components includes a platform and a shank extending radially inwardly from the platform, each shank including a radially extending first side channel and an opposite radially extending second side channel;
resiliently deforming a body of a radial seal inwardly, the body including a U-shaped portion located generally centrally between a first leg and a second leg wherein deforming the body includes pressing the first leg and the second leg closer together;
inserting the resiliently deformed radial seal from an axially upstream direction such that the first leg of the radial seal is received in the first side channel of the first rotary component, the second leg of the radial seal is received in the second side channel of the second rotary component, and the body extends therebetween; and releasing the body, such that the first and second legs are biased away from each other and are retained in the respective first side channel of the first rotary component and the second side channel of the second rotary component.

20. The method of claim 19, wherein:

the first and second side channels cooperate to define a circumferential seal channel width at a downstream end of the first and second side channels and a circumferential channel entry width at an opposite upstream end of the first and second side channels, the channel entry width is smaller than the seal channel width, the radial seal has a circumferential resting width wider than the channel entry width, and said resiliently deforming the body of the radial seal comprises resiliently deforming the radial seal to a width smaller than the channel entry width, such that the first and second legs are receivable through the channel entry width.

21. The method of claim 19, wherein said inserting the resiliently deformed radial seal from the axially upstream direction is performed after assembly of the circumferentially extending row of the plurality of rotary components.

22. The method of claim 19, wherein:

each shank further includes a first side face, an opposite second side face, and a downstream face, the first side channel defined in the first side face proximate to the downstream face, and the second side channel defined in the second side face proximate to the downstream face, and said inserting the resiliently deformed radial seal comprises orienting the body to extend axially upstream into a cavity defined between the respective first side face of the respective first rotary component and the respective second side face of the respective second rotary component.

* * * * *